Nov. 27, 1956 A. W. RYBERG 2,771,778
END PLATE FOR A GYROSCOPE ROTOR OR THE LIKE
Filed Oct. 24, 1955

INVENTOR.
Arling W. Ryberg
BY
Leonard S. Kunfsef
Attorney

United States Patent Office 2,771,778
Patented Nov. 27, 1956

2,771,778

END PLATE FOR A GYROSCOPE ROTOR OR THE LIKE

Arling W. Ryberg, Grand Rapids, Mich., assignor to Lear, Incorporated, Grand Rapids, Mich., a corporation of Illinois Application October 24, 1955, Serial No. 542,196

9 Claims. (Cl. 74—5)

This invention relates to improvements in gyroscopes and other devices which include a body in the nature of a flywheel rotating at high speed and in which the principal mass is at the periphery and is joined to the bearings by relatively thin webs.

For example, in certain types of electrically-driven gyroscopes the rotor is formed as the armature of a motor while the fixed field is carried therewithin on a fixed shaft. In turn, the rotor is supported on bearings carried on this shaft. In order to provide a rotor of maximum available angular momentum the greatest possible portion of its mass is concentrated at the periphery and substantially flat discs just sufficiently strong to carry the peripheral mass are utilized to support the rotor on its bearings. However, and especially in gyroscopic instruments as used in aerial navigation, utmost accuracy is essential, since unbalanced forces set up unwanted precessive torques which result in inaccurate indications or control by the gyroscope.

In a gyroscope of the class outlined in which the rotor is provided with relatively flat end discs changes in relative position of the parts due to temperature, or inaccuracies in mechanical fits will frequently evidence themselves as so-called "oil canning" which is a deformation of the end discs into shallow dish form. Such deformation may be concave or convex, when viewed from the exterior of the rotor and is also unpredictable in magnitude. Thus the resulting misalignment and eccentricity give rise to unbalanced forces and consequent serious problems in maintaining the required accuracy of performance of the instrument.

Inasmuch as this deformation of the end plates has been found to be due to forces acting principally in a radial direction the present invention provides means for absorbing these forces in a manner which avoids the above-described deformation of the end discs.

Another object is to provide means as aforesaid so constructed as to maintain the overall dimensions of the rotor unchanged.

A further object is to provide means for neutralizing deformative forces as aforesaid which does not entail the use of moving parts, or parts requiring any adjustment.

Other objects will appear from the following description which, taken with the accompanying drawing, discloses certain forms the invention may assume in practice.

Figure 1:
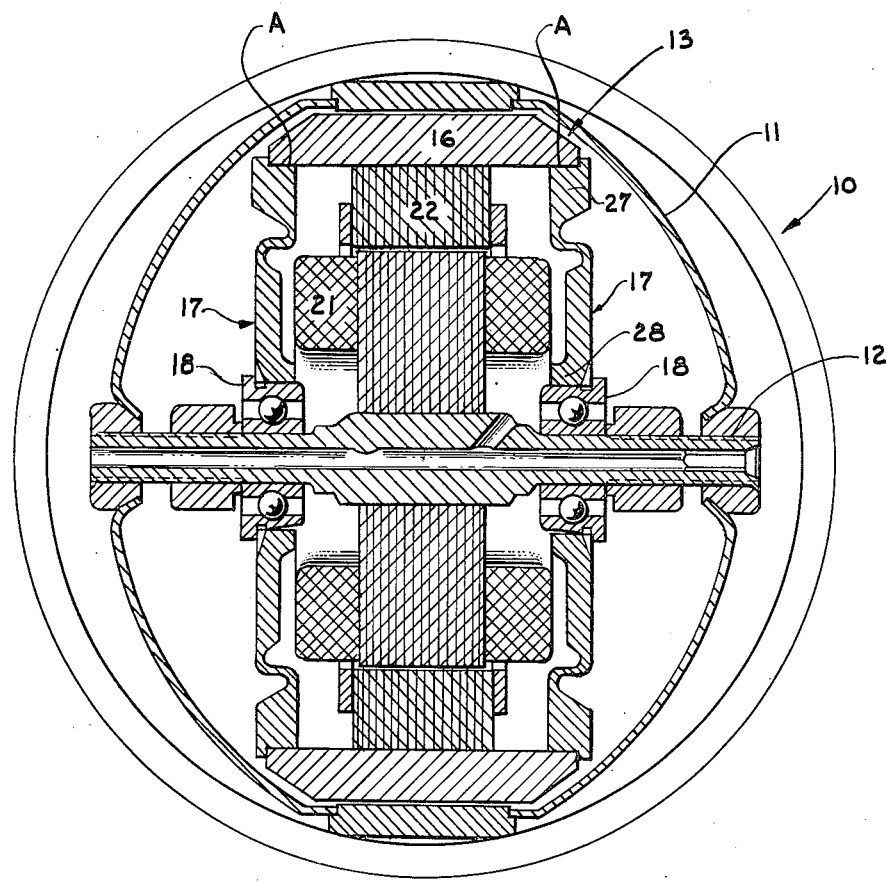
Fig. 1 shows a medial cross section of a gyroscope embodying the invention.

Regarded broadly the invention comprehends the provision, in an annular end disc forming part of a rotatable drum, of an annular zone so constructed and arranged as to provide adequate tensile strength for withstanding centrifugal and axial forces tending to disrupt the disc while possessing sufficient resiliency as to yield under those compressive forces which result in that deformation of the disc known as "oil canning."

As an example of a typical environment in which the invention may be embodied I have illustrated a gyroscope 10 which includes a gimbal 11 supporting a fixed shaft 12 upon which the rotor 13 is carried. Rotor 13 includes a heavy rim 16 in order to position the revolving mass at the greatest practical distance from the axis whereby to obtain maximum angular momentum, and a pair of end discs 17 of annular form secured to the rim in any suitable manner and to anti-friction bearings 18. These latter are affixed to shaft 12 as is conventional. Shaft 12 also supports a fixed winding 21 serving as a motor field and the rim 16 carries the movable winding 22 also as is common.

Essentially the rim 16 is designed to withstand centrifugal forces to which it may be subjected. Stated otherwise the joints at A—A are relied upon only to provide proper axial positioning and the discs 17 need therefore be of only such dimensions and material as to provide adequate strength in their own right. Due to the limitations on overall weight and dimensions characteristic of gyroscopes of the kind here contemplated the discs 17 are desirably made of minimum dimensions while the rim and its thereto-attached winding are relied upon as the prime source of the angular momentum. Consequently as the gyroscope heats up in operation the discs 17 have, in the absence of the invention improvement, deformed axially into dish form, herein referred to for brevity as "oil canning." Such distortion may occur either inwardly or outwardly of the rotor but in any case is unpredictable as to degree and configuration. Regardless of the care which may be devoted to initial dynamic balancing of the rotor this "oil canning" creates unbalanced forces which evidence themselves in undesirable precessing of the gyroscope. Thus performance of the gyroscope becomes erratic and unacceptable.

It has been found that the primary, if not the only force causing oil-canning is exerted virtually normally to the axis of rotation and is probably due solely to those forces exerted by the rim. It is also possible that, since the rim is fixed at its edges, radial deflection is maximum at its center thereby instrumenting deflection of the end discs.

Figures 2, 3:
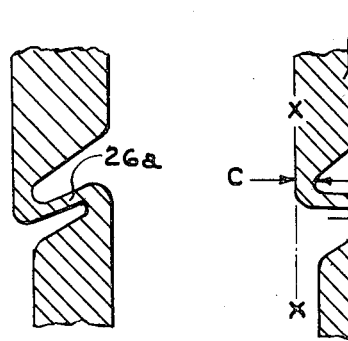
Fig. 2 is an enlarged cross section of a portion of the improved end disc.
Figs. 3 and 4 are views similar to those of Fig. 2 showing modified forms of the invention.

The invention arranged introduces an annular strain-absorbing annular section at some region of the end disc so situated and constructed as to act resiliently when subjected to radial stress. As seen in Figs. 1 and 2 an annular web 26, which is a section of a thin, cylindrical shell coaxial with the axis of rotation, is introduced in an area somewhat closer to the outer periphery 27 of the disc than to the hub 28 thereof. Preferably the web 26 is of uniform thickness over a central zone thereof merging into the outer and inner sections A and B respectively of the disc with suitable fillets and rounded corners being provided to transmit strains between the outer and inner sections of the disc and through the web without possibility of fatigue failure due to flexure of the web. Also, desirably, the web is cojoined to the neighboring portions of the disc at its extreme edges and as indicated by the lines X—X and Y—Y, whereby maximum bending moment may be applied to the web by the sections A and B without unnecessarily increasing the overall thickness of the disc. It has been determined that, in a disc having an external diameter of approximately 2¼" and an internal diameter of approximately ¾", the section A may be 5/32" thick, the section B may be 3/32" thick and the web 26 may be 0.020" thick at its center. Dimensions C—C are also preferably on the order of 0.020". End discs, when so constructed, and operating under the identical conditions to which prior conventional flat discs have been subjected have been found to be free from measurable oil-canning.

Figure 4:
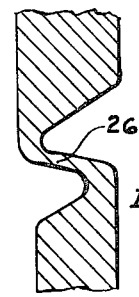

In Figs. 3 and 4 I have illustrated alternative embodiments in which the web 26a or 26b, as the case may be is inclined as a frustum of a conical shell rather than cylindrical, as in Figs. 1 and 2. While either alternative form is within the principles of the invention the form of Fig. 2 is simpler to manufacture.

It will be apparent that the invention is also adaptable to a rotor in which a single disc supports a rotatable rim with respect to an axis of rotation.

While I have shown certain embodiments of my invention, it will be understood, of course, that I do not wish to be limited thereto since many modifications may be made and I therefore contemplate by the appended claims to cover any such modifications as fall within the true spirit and scope of my invention.

I claim:

1. In a gyroscope or the like having its rotating mass concentrated principally in the annular rim of a rotating member in the form of a hollow flywheel, and in which the member serves as the rotor with respect to a fixed stator mounted internally of the rotor the improvement comprising: a disc for supporting said rim on the axis of rotation, said disc having a web forming a part thereof and positioned intermediate the rim and axis, said web being constituted as a section of a hollow cylinder coaxial with said axis and merged with the adjacent sections of the disc, said web being of less radial thickness than the axial thickness of said disc sections, whereby stresses on said disc having a tendency to buckle the disc are absorbed principally by deformation of the web and the regions of merger thereof with the adjacent disc sections.

2. The combination in accordance with claim 1 wherein said web and disc sections are integral.

3. The combination in accordance with claim 1 wherein said web is merged with said disc sections in curved planes constituting substantially quadrantal fillets and chamfers.

4. In a gyroscope or the like having its rotating mass concentrated principally in the annular rim of a rotating member in the form of a hollow flywheel, and in which the member serves as the rotor with respect to a fixed stator mounted internally of the rotor the improvement comprising: a pair of discs each positioned at an edge of the rim for carrying the rim on the axis of rotation, each said disc having a web forming a part thereof and positioned intermediate the rim and axis, said web being constituted as a section of a hollow cylinder coaxial with said axis and merged with the adjacent sections of the disc, said web being of less radial thickness than the axial thickness of said disc sections, whereby stresses on said disc having a tendency to buckle the disc are absorbed principally by deformation of the web and the regions of merger thereof with the adjacent disc sections.

5. In a gyroscope or the like having its rotating mass principally in the annular rim of a rotating member in the form of a hollow flywheel, and in which the member serves as the rotor with respect to a fixed stator mounted internally of the rotor and there is provided a shaft supporting the member for rotation the improvement comprising: a disc for supporting the rim on the axis of rotation, said disc including an outer annular part having its outer perimeter secured to the rim, an inner annular part having means for mounting the member on the shaft, said parts being thinner in an axial direction in relation their radial extent and the respective principal planes thereof being offset axially, and a web joining said parts, said web being so dimensioned and proportioned that radial stresses on said parts are absorbed substantially entirely by bending of said web relative to said parts.

6. The improvement in accordance with claim 5 wherein said web is annular and the thickness thereof measured radially is less than the axially measured thickness of either said part.

7. The improvement in accordance with claim 5 wherein inside corners at the junction of said web and parts are fillets and outside corners are rounded.

8. The improvement in accordance with claim 5 wherein the said web is a longitudinal segment of a hollow cylinder, the thickness of the wall thereof is less than the axially measured thickness of either said part.

9. The improvement in accordance with claim 7 wherein the junction of said web with said parts comprises a graduated merging of the thinner section of the web into the greater thickness of the parts.

References Cited in the file of this patent

UNITED STATES PATENTS

| | | |
|---|---|---|
| 2,075,797 | Blair | Apr. 6, 1937 |
| 2,249,834 | Kreh | July 22, 1941 |
| 2,719,291 | Wing | Sept. 27, 1955 |